July 31, 1945. H. F. KOHLER 2,380,532
SEPARATION OF MONO-AND DI-ALKYL ESTERS OF SULPHURIC ACID
Filed Jan. 28, 1943
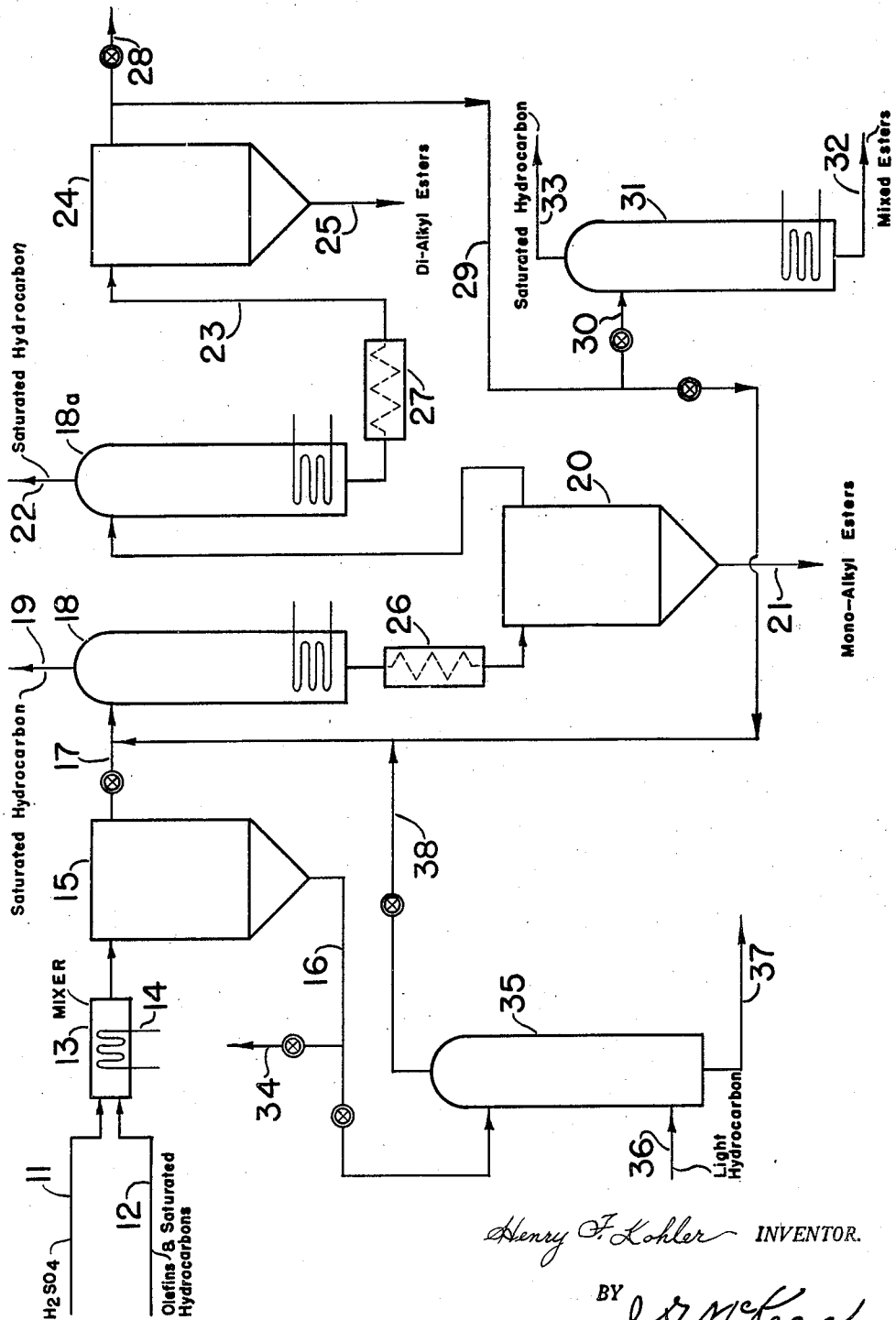
Henry F. Kohler INVENTOR.
BY J. D. McKean
ATTORNEY Patented July 31, 1945

2,380,532

UNITED STATES PATENT OFFICE 2,380,532

SEPARATION OF MONO- AND DI-ALKYL ESTERS OF SULPHURIC ACID

Henry F. Kohler, Baytown, Tex., assignor to Standard Oil Development Company, a corporation of Delaware Application January 28, 1943, Serial No. 473,790

4 Claims. (Cl. 260—460)

The present invention is directed to the separation of the mono- and di-alkyl esters of sulphuric acid.

It is well known to the art that sulphuric acid will combine with olefins to form both the mono- and di-alkyl esters. There is evidence to indicate that a chemical equilibrium is set up which may be represented as follows:

$$\text{Olefin} + H_2SO_4 \rightleftarrows RHSO_4 + \text{olefin} \rightleftarrows R_2SO_4$$

The equilibrium of the reaction may be altered by changing the concentration of the reactants. For example, a low acid-olefin ratio (around 1:2) will give larger amounts of the di-alkyl ester whereas a higher ratio (around 2:1) will give more of the mono-alkyl esters. While the equilibrium may be altered by regulating the conditions of the reaction, a mixture of the mono- and di-alkyl esters is still obtained. There is a substantial commercial demand for the alkyl esters mentioned above, for example, in the alkylation of isoparaffins, and it is often desirable to separate the mono-alkyl ester from the di-alkyl ester.

The present invention is directed to the separation or fractionation of a mixture of mono- and di-alkyl esters. The invention may be broadly described as including the steps of obtaining a solution of both the mono- and di-alkyl esters in a low boiling saturated hydrocarbon and altering the concentration of the esters in the solution to selectively separate a mono-alkyl ester fraction and a di-alkyl ester fraction.

A preferred manner of practicing the present invention will now be described in conjunction with the drawing in which the single figure is in the form of a diagrammatical flow sheet.

Turning now specifically to the drawing, sulphuric acid flowing through pipe 11 and a mixture of olefins and low boiling saturated hydrocarbons flowing through pipe 12 are conducted to a mixing vessel 13 where they are reacted in the well known manner to produce a mixture of mono- and di-alkyl esters. The temperature within vessel 13 may be regulated by use of a cooling coil 14. The product from mixer 13 may be withdrawn to settling vessel 15 where it is separated under the influence of gravity to form an upper layer comprising esters dissolved in the low boiling saturated hydrocarbon and acid having dissolved therein smaller amounts of the esters. The acid fraction may be withdrawn from the settler via line 16 and the hydrocarbon fraction via line 17.

In order to separate the admixture of esters into a mono-alkyl ester fraction and a di-alkyl ester fraction, the solution of the mono- and di-alkyl esters in saturated hydrocarbon is passed via line 17 to vaporizer 18 where a portion of the saturated hydrocarbon is removed as vapor through line 19. The product from the vaporizer may be withdrawn as bottoms and sent to settler 20 where the mono-alkyl esters are separated out as a heavy fraction under the influence of gravity and are removed through drawoff line 21. The lighter fraction from settler 20, comprising the saturated hydrocarbon with di-alkyl esters dissolved therein as well as the residual mono-alkyl esters, may be passed to a second vaporizer 18a where additional saturated hydrocarbon is removed therefrom through line 22 and then withdrawn via line 23 to settler 24. In this vessel a di-alkyl ester fraction separates from the light hydrocarbon and may be withdrawn from the bottom of the vessel via line 25.

It is generally desirable to regulate quite closely the temperature at which the two fractions are separated in settling vessels 20 and 24, respectively, and, accordingly, a heat exchanger 26 may be arranged in the line between vaporizer 18 and settler 20 and heat exchanger 27 may be placed in the line between vaporizer 18a and settler 24. It is preferable to maintain vessels 20 and 24 at different temperatures. For example, it has been found that good results may be obtained by maintaining a temperature of 20° F. in vessel 20 and a temperature of 10° F. in vessel 24. On some occasions, a temperature of 10° F. may be desirable in vessel 20 and a temperature of 0° F. in vessel 24. It will also be evident that other temperatures may be maintained in the settling vessel as desired.

The lighter fraction obtained by settling in vessel 24 comprises low boiling saturated hydrocarbons having dissolved therein the remnant of mono-alkyl and di-alkyl esters which were not separated out in the vessels 20 and 24. This admixture may be withdrawn from the system via line 28 if desired or may be recirculated by line 29 and admixed with the solution being withdrawn from vessel 15 to the first vaporizer 18. Alternatively, this solution may be passed via line 30 into vaporizer 31 and a mixture of mixed esters withdrawn by line 32 and the saturated hydrocarbon removed as vapors via line 33.

It will be understood that the acid withdrawn from the first settling vessel 15 contains appreciable amounts of esters dissolved therein. This solution of esters in the acid may be withdrawn from the system via line 34 or if desired may be extracted with a suitable solvent to remove the esters. If the latter course is desired, the sulphuric acid in which the esters are dissolved may be conducted to the upper portion of solvent extraction tower 35 and allowed to flow downwardly therein countercurrent to a suitable solvent. It is desirable to use a low boiling saturated hydrocarbon as the solvent so that the extracted esters may be separated in the remainder of the system above described. Following this procedure, a light hydrocarbon is forced into the extraction tower 35 through line 36 and allowed to flow upwardly in the tower countercurrently to the sulphuric acid. The sulphuric acid is withdrawn from the bottom of the tower via line 37 while the solution of esters in light hydrocarbon may be conducted from the top of the tower via line 38 into line 29 and admixed with the light hydrocarbon and esters flowing from vessel 15 to vaporizer 18.

It will be apparent that the above described procedure is generally applicable to the separation of mono- and di-alkyl esters. A number of saturated hydrocarbons or saturated hydrocarbon mixtures may be employed in effecting the separation of the mono-alkyl from the di-alkyl esters. Normal butane has been found particularly suitable for use in this process, but other hydrocarbons such as propane, pentane, hexane and mixtures of these hydrocarbons are also satisfactory. In commercial operations, esters formed by the reaction of sulphuric acid with butylenes are particularly in demand but the procedure above described may obviously be applied to other alkyl esters formed by the reaction of sulphuric acid with olefins such as amylenes and hexylenes.

Having fully described and illustrated the present invention, what I desire to claim is:

1. A method of separating a mixture of mono- and di-alkyl esters comprising the steps of forming a solution of mono-alkyl sulphates and di-alkyl sulphates in a low boiling hydrocarbon solvent, removing a portion of said solvent from said solution by vaporization and settling to obtain a mono-alkyl sulphate fraction, removing said mono-alkyl sulphate fraction, vaporizing low boiling hydrocarbon solvent from the remainder and settling to obtain a di-alkyl sulphate fraction and removing said di-alkyl sulphate fraction.

2. A method of obtaining mono- and di-alkyl esters comprising the steps of admixing sulphuric acid with olefin and low boiling saturated hydrocarbon and allowing said mixture to react to form mono- and di-alkyl esters, passing the reaction product to a settling zone and allowing it to settle into a spent sulphuric acid fraction and a solution of mono- and di-alkyl esters in hydrocarbon solvent, separating said fractions, vaporizing a portion of solvent from said solution to precipitate out a liquid mono-alkyl fraction, settling to separate said mono-alkyl fraction from the remaining solution, vaporizing additional hydrocarbons from said solution to precipitate a liquid di-alkyl ester fraction and settling to remove said fraction.

3. A method in accordance with claim 2 in which the sulphuric acid withdrawn from said first settling zone is extracted with low boiling saturated hydrocarbon solvent and said extract is passed through said vaporizing and settling zones to separate a mono-alkyl ester and a di-alkyl ester fraction therefrom.

4. A method in accordance with claim 2 in which the low boiling hydrocarbon solvent withdrawn from said second settling zone is passed to a subsequent vaporizing zone and the hydrocarbon is vaporized from residual esters.

HENRY F. KOHLER.